(12) United States Patent
Hoang et al.

(10) Patent No.: US 10,082,584 B2
(45) Date of Patent: Sep. 25, 2018

(54) HYBRID DEVICE LOCATION DETERMINATION SYSTEM

(71) Applicant: Microsoft Technology Licensing, LLC, Redmond, WA (US)

(72) Inventors: Peter S. Hoang, Snoqualmie, WA (US); Jedd A. Perry, Monroe, WA (US); Rod G. Fleck, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/726,458

(22) Filed: Dec. 24, 2012

(65) Prior Publication Data

US 2013/0342391 A1 Dec. 26, 2013

Related U.S. Application Data

(63) Continuation of application No. 13/529,210, filed on Jun. 21, 2012, now abandoned.

(51) Int. Cl.
*G01S 5/02* (2010.01)
*G01S 19/48* (2010.01)
*G01S 19/49* (2010.01)

(52) U.S. Cl.
CPC ............ *G01S 19/48* (2013.01); *G01S 5/0263* (2013.01); *G01S 19/49* (2013.01)

(58) Field of Classification Search
CPC ... G01S 19/48; G01S 5/02; G01S 5/14; G01S 5/0263; G01S 19/34; G01S 5/023; G01S 19/49; G01S 19/47; H04W 64/00
USPC ................... 342/357.31, 464, 357.32, 357.3; 455/456.1, 456.6
See application file for complete search history.

(56) References Cited

U.S. PATENT DOCUMENTS

| | | | |
|---|---|---|---|
| 7,313,404 B2 * | 12/2007 | Anderson | ................... 455/456.1 |
| 2002/0019698 A1 * | 2/2002 | Vilppula | ............... G01S 5/0257 |
| | | | 702/150 |
| 2006/0211430 A1 * | 9/2006 | Persico | ................. G01S 5/0263 |
| | | | 455/456.1 |
| 2008/0167814 A1 * | 7/2008 | Samarasekera et al. | ..... 701/213 |
| 2009/0043504 A1 | 2/2009 | Bandyopadhyay et al. | |
| 2009/0262974 A1 | 10/2009 | Lithopoulos | |
| 2009/0323121 A1 | 12/2009 | Valkenburg et al. | |

(Continued)

OTHER PUBLICATIONS

Chu, Tianxing et al., "Monocular Camera/IMU/GNSS Integration for Ground Vehicle Navigation in Challenging GNSS Environments", Available at <http://www.mdpi.com/1424-8220/12/3/3162/pdf>, MDPI Sensors 2012, vol. 12, Issue 3,(Mar. 7, 2012), pp. 3162-3185.

(Continued)

*Primary Examiner* — Bernarr E Gregory
*Assistant Examiner* — Fred H Mull
(74) *Attorney, Agent, or Firm* — Rainier Patents, P.S.

(57) ABSTRACT

Various different techniques are used to determine a location of a device, including 3-dimensional (3D) mapping techniques as well as one or more of Global Navigation Satellite System (GNSS) techniques, wireless signal detection techniques, and inertial sensor techniques. The locations determined by these various techniques are combined to determine the location of the device and/or user of the device. In addition to the location of the device, an orientation or direction of view of the device and/or user of the device can optionally be determined as well.

20 Claims, 5 Drawing Sheets

(56) References Cited

U.S. PATENT DOCUMENTS

| | | | |
|---|---|---|---|
| 2010/0176987 A1* | 7/2010 | Hoshizaki | G01S 19/48 342/357.23 |
| 2010/0305854 A1* | 12/2010 | Kammel | A01D 34/008 701/469 |
| 2011/0161875 A1 | 6/2011 | Kankainen | |
| 2011/0166783 A1* | 7/2011 | Ren | G01C 21/3638 701/455 |
| 2011/0306323 A1 | 12/2011 | Do et al. | |
| 2012/0105474 A1* | 5/2012 | Cudalbu | H04W 4/02 345/633 |
| 2013/0257649 A1* | 10/2013 | Chang | 342/357.28 |
| 2013/0288702 A1* | 10/2013 | Abu-Alqumsan et al. | 455/456.1 |

OTHER PUBLICATIONS

El-Sheimy, Naser et al., "Everywhere Navigation", Available at <http://www.insidegnss.com/auto/sepoct11-El%20Sheimy.pdf>, InsideGNSS, Sep./Oct. 2011,(Sep. 2011), pp. 74-82.

Le, Mahn Hung V. "Indoor Navigation System for Handheld Devices", Available at <http://www.wpi.edu/Pubs/E-project/Available/E-project-102209-164024/unrestricted/Indoor_Navigation_System_for_Handheld_Devices.pdf >, A Major Qualifying Project Report, Worcester Polytechnic Institute, Worcester, Massachusetts, USA,(Oct. 22, 2009), 198 pages.

Miyaki, T. et al., "Multi-Sensor Fusion Tracking Using Visual Information and Wi-Fi Location Estimation", Available at <http://ieeexplore.ieee.org/stamp/stamp.jsp?tp=&arnumber=4357534>, In Proceedings of ICDSC 2007,(Sep. 25, 2007), pp. 275-282.

* cited by examiner

HYBRID DEVICE LOCATION DETERMINATION SYSTEM

RELATED APPLICATIONS

This application is a continuation of U.S. patent application Ser. No. 13/529,210, filed Jun. 21, 2012, entitled "HYBRID DEVICE LOCATION DETERMINATION SYSTEM", which is hereby incorporated by reference herein in its entirety.

BACKGROUND

As cellular phones and other mobile computing devices have become more commonplace and powerful, the desire for certain applications to provide location-based functionality on these devices has increased. In order to provide such location-based functionality on a device, the location of the device needs to be known. The location of a device can sometimes be determined based on coordinates received from a global positioning system (GPS) of the device. However, it can be difficult to accurately determine the location of a device under certain circumstances, such as when the GPS receiver of the device is not able to determine an accurate location of the device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first location of a device at a particular time is obtained based on a 3D map of an environment in which the device is located. A second location of the device at the particular time is also obtained based on one or more of a satellite system, signals received from one or more transmitters, and/or one or more inertial sensors. Based on both the first location and the second location, the location of the device at the particular time is determined.

In accordance with one or more aspects, a 3D mapping determined location of a computing device at a particular time is obtained. A wireless signal determined location of the computing device, an inertial sensor determined location of the computing device, and/or a GNSS determined location of the computing device at the particular time is also obtained. Based on these obtained locations, a location of the computing device is determined.

BRIEF DESCRIPTION OF THE DRAWINGS

The same numbers are used throughout the drawings to reference like features.

DETAILED DESCRIPTION

A hybrid device location determination system is discussed herein. Various different techniques are used to determine a location of a device, including 3-dimensional (3D) mapping techniques as well as one or more of Global Navigation Satellite System (GNSS) techniques, wireless signal detection techniques, and inertial sensor techniques. The locations determined by these various techniques are combined to determine the location of the device and/or user of the device. In addition to the location of the device, an orientation or direction of view of the device and/or user of the device can optionally be determined as well.

Figure 1:
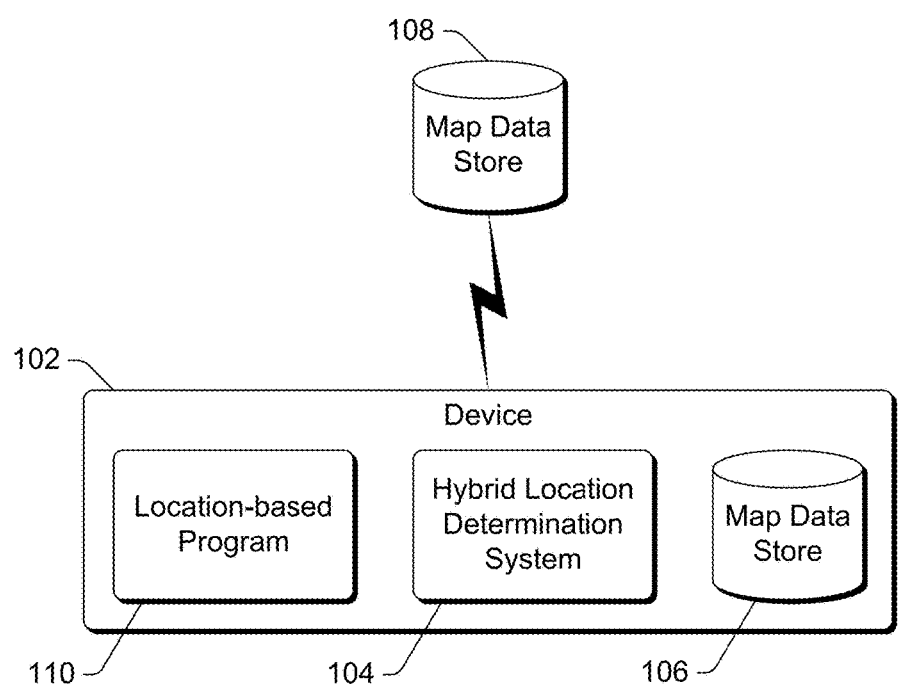
FIG. 1 illustrates an example system implementing the hybrid device location determination system in accordance with one or more embodiments.

FIG. 1 illustrates an example system 100 implementing the hybrid device location determination system in accordance with one or more embodiments. System 100 includes a device 102, which can be a variety of different types of devices. Device 102 is typically a mobile device, the location of which is expected to change over time. For example, a device 102 can be a cellular or other wireless phone, a laptop or netbook computer, a tablet or notepad computer, a mobile station, an entertainment appliance, a game console, an automotive computer, and so forth. Thus, device 102 may range from full resource devices with substantial memory and processor resources (e.g., laptop computers, tablet computers) to low-resource devices with limited memory and/or processing resources (e.g., entertainment appliances, handheld game consoles).

Device 102 includes a hybrid location determination system 104. Hybrid location determination system 104 uses a combination of various different techniques to determine the location of device 102 at any particular time. These different techniques include 3-dimensional (3D) mapping in combination with one or more other techniques, such as Global Navigation Satellite System (GNSS) techniques, wireless signal detection techniques, inertial sensor techniques, and so forth. These various techniques are discussed in more detail below. In addition to determining the location of device 102 at any particular time, hybrid location determination system 104 can also optionally determine the orientation or direction of view of device 102 and/or a user of device 102. Thus, using the techniques discussed herein not only is the location of device 102 and/or a user of the device 102 determined, but the orientation or direction of that device 102 can also be determined.

Hybrid location determination system 104 leverages one or more map data stores. Hybrid location determination system 104 can obtain map data from one or more map data stores and use the obtained data in determining the location of device 102. Hybrid location determination system 104 can also provide map data generated by device 102 to one or more map data stores, which can in turn provide the map data generated by device 102 to other devices. The map data stores maintain 3D maps of various environments, and/or data from which 3D maps of various environments can be generated.

The one or more map data stores can include one or more local map data stores 106 that are included in device 102 and/or one or more map data stores 108 that are separate from device 102. Map data stores 108 can be accessed via any of a variety of communication links, such as a network (e.g., the Internet, a local area network (LAN), a wide area network (WAN), a storage area network (SAN), a personal area network (PAN), a telephone network, an intranet, other public and/or proprietary networks, combinations thereof, and so forth), a wired communication link (e.g., a universal serial bus (USB) connection, an IEEE 1394 connection, etc.), a wireless communication link (e.g., wireless USB connection, a Wi-Fi connection, and etc.), and so forth. Although map data stores 106 and 108 are illustrated in system 100, system 100 may include map data store 106 but not map data store 108, or may include map data store 108 but not map data store 106.

Device 102 also optionally includes one or more location-based programs 110. Each location-based program 110 is a program that provides functionality that is based at least in part on the location of device 102. A location-based program 110 can be implemented in different manners, such as as part of an operating system of device 102, as a separate application run by an operating system of device 102, as part of a script or other interpreted program run on device 102, and so forth.

A location-based program 110 can provide various functionality based on the location of device 102. A location-based program 110 can be any program in which a generated output, a calculated or otherwise determined value, an interpretation of an input, and so forth is dependent on the location of device 102. For example, a location-based program 110 can be a mapping program that displays a map indicating a current location of device 102, and/or that displays various information (e.g., landmarks or restaurants in close proximity, history or other descriptive information regarding a location, other users in close proximity, etc.) based on the current location of device 102. By way of another example, a location-based program 110 can be a data collection program that records locations of device 102 as well various wireless signals and the strengths of such wireless signals received by the device 102 at those locations, providing the recorded data to a crowd sourcing service. By way of another example, a location-based program 110 can be an augmented reality program that augments a display of a current location of device 102 with additional objects or alterations of the display.

It should be noted that device 102 need not include a location-based program 110. For example, hybrid location determination system 104 can determine the location of device 102 and store the location on device 102 or communicate the location to another device or component. One or more location-based programs on one or more other devices can obtain and use the stored or communicated location of device 102.

Device 102 can also receive user inputs from a user of device 102, which can be provided in a variety of different manners. User inputs can be provided by pressing one or more keys of a keypad or keyboard of device 102, pressing one or more keys of an input device (e.g., remote control device, mouse, track pad, etc.) of device 102, touching a particular portion of a touchpad or touchscreen of device 102, positioning a finger or other object (or making a particular gesture with a finger or pointer) within a particular distance of a screen or input device of device 102, making a particular gesture on a touchpad or touchscreen of device 102, and/or making a particular gesture on or in an input device (e.g., remote control device, mouse, track pad, etc.) of device 102. User inputs can also be provided via other physical feedback input to device 102, such as tapping any portion of device 102, bending or twisting device 102, an action that can be recognized by a motion detection component of device 102 (such as shaking the device, rotating the device, etc.), and so forth. User inputs can also be provided in other manners, such as via voice or other audible inputs to a microphone, via motions of hands or other body parts observed by an image capture device, and so forth.

In one or more embodiments, the determining of the location of a device and/or the providing of the location to other programs is performed only after receiving user consent to do so. This user consent can be an opt-in consent, where the user takes an affirmative action to request that the location be determined and/or provided before system 104 performs any determining and/or providing of the location of device 102 and/or a user of device 102. Alternatively, this user consent can be an opt-out consent, where the user takes an affirmative action to request that the location not be recorded and/or provided; if the user does not choose to opt out of this determining and/or providing of the location of device 102 and/or a user of device 102, then it is an implied consent by the user to determine the location and provide the location to other programs.

Furthermore, it should be noted that the techniques discussed herein can allow device 102 to provide a location of device 102 and/or a user of device 102 to another program, but need not include any personal information identifying the particular user of device 102 and/or the particular device 102. For example, a device 102 can determine a location of the device and provide the location to another program, but no association between the device 102 and the location need be provided to and/or maintained by the other program. Similarly, no association between the user of the device 102 and the location need be provided to and/or maintained by the other program.

Figure 2:
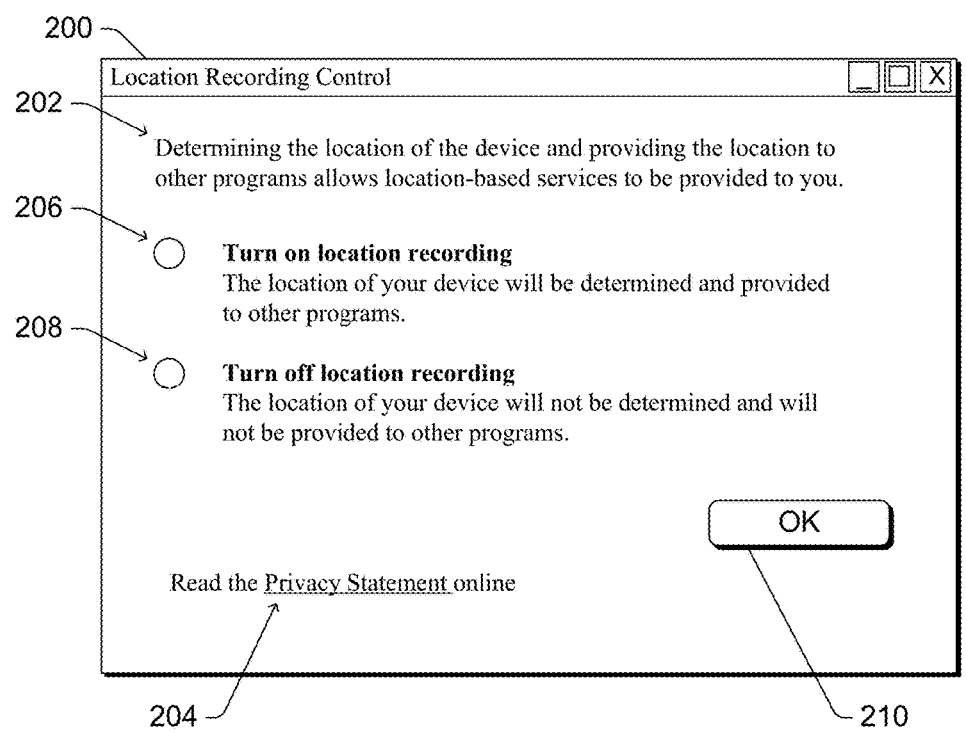
FIG. 2 illustrates an example user interface that can be displayed to a user of a device to allow the user to select whether location data for that device will be determined and provided to other programs in accordance with one or more embodiments.

FIG. 2 illustrates an example user interface that can be displayed to a user of a device to allow the user to select whether location data for that device will be determined and provided to other programs in accordance with one or more embodiments. A location recording control window 200 is displayed including a description 202 explaining to the user why the location of the device is being determined A link 204 to a privacy statement is also displayed. If the user selects link 204, a privacy statement is displayed, explaining to the user how the determined location data is kept confidential and/or how no association between the location and the device (as well as the user of the device) is maintained.

Additionally, the user is able to select a radio button 206 to opt-in to the location determining and providing, or a radio button 208 to opt-out of the location determining and providing. Once a radio button 206 or 208 is selected, the user can select an "OK" button 210 to have the selection saved. It is to be appreciated that radio buttons and an "OK" button are only examples of user interfaces that can be presented to a user to opt-in or opt-out of the location determining and providing, and that a variety of other conventional user interface techniques can alternatively be used. The device then proceeds to determine the device location and provide the device location to other programs, or neither record the device location nor provide the device location to other programs, in accordance with the user's selection. Although not illustrated in FIG. 2, location recording control window 200 can also optionally allow a user to select or otherwise identify particular other programs to which the location of the device can be provided. In response to user selection or other identification of particular programs, the location of the device is provided to those particular programs but is not provided to other programs.

Figure 3:
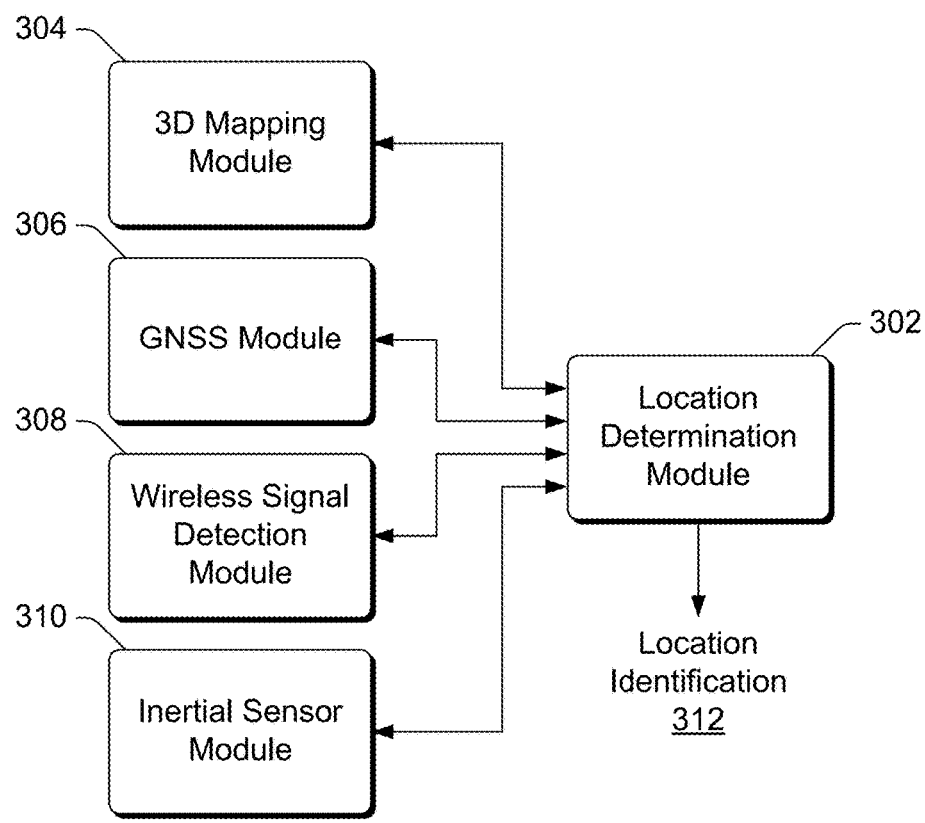
FIG. 3 illustrates an example hybrid location determination system in accordance with one or more embodiments.

FIG. 3 illustrates an example hybrid location determination system 300 in accordance with one or more embodiments. Hybrid location determination system 300 can be, for example, a hybrid location determination system 104 of FIG. 1. System 300 includes a location determination module 302, a 3D mapping module 304, a GNSS module 306, a wireless signal detection module 308, and an inertial sensor module 310. Each module 302-310 can be implemented in software, firmware, hardware, or combinations thereof. Although specific modules 302-310 are illustrated, it should be noted that at least some of the functionality of multiple ones of modules 302-310 can be combined into a single module, and/or the functionality of one or more of modules 302-310 can be separated into multiple modules.

Hybrid location determination system 300 as illustrated includes modules 304, 306, 308, and 310. However, in one or more embodiments all of modules 304-310 need not be included. System 300 typically includes 3D mapping module 304 and at least one of modules 306-310, however one or more of modules 306-310 may not be included in system 300 or may not be in use (e.g., may be powered down) at any given time.

Location determination module 302 determines a location of a device, which is typically (but need not be) the device that includes hybrid location determination system 300 (e.g., device 102 of FIG. 1). The location of the device is also referred to as a location of the user of the device. Module 302 makes the determined location of the device available as location identification 312. Module 302 can make the determined location available in different manners, such as sending a message or other notification of the determined location to various other programs or modules, providing the determined location as a parameter, storing the determined location in a particular location of the device accessible to other modules and programs, and so forth.

Location determination module 302 determines a location of the device based on the locations of the device as determined by modules 304-310. Each of modules 304-310 determines a location of the device in different manners, and the accuracy with which each of modules 304-310 determines the location of the device at any given time can vary. Module 302 combines the locations of the device as determined by modules 304-310 to generate location identification 312.

GNSS module 306 implements GNSS functionality for system 300, determining a location of the device based on one or more satellites from which GNSS module 306 can receive signals or otherwise communicate. This GNSS determined location is typically latitude and longitude coordinates (and optionally altitude), although the location can alternatively be specified in other manners. GNSS module 306 can implement the GNSS functionality using a variety of different technologies, such as the Global Positioning System (GPS), the Global Navigation Satellite System (GLONASS), the BeiDou (or Compass) navigation system, the Galileo positioning system, combinations thereof, and so forth.

GNSS module 306 provides or otherwise makes available the GNSS determined location of the device to location determination module 302. GNSS module 306 can also provide or otherwise make available to module 302 additional information, such as an indication of the strength of signals received by module 306 from satellites. An accuracy of the GNSS determined location can also be determined, such as by GNSS module 306 and/or location determination module 302. The accuracy can be determined in different manners, such as based on the strength (e.g., received signal strength indicator (RSSI) values) of signals received by module 306 from satellites, a number of satellites from which signals are received by module 306, and so forth.

GNSS module 306 can determine the location of the device at regular or irregular intervals. GNSS module 306 can also determine the location of the device in response to various events, such as a request from another module of the device and/or of system 300.

Wireless signal detection module 308 implements wireless signal detection functionality for system 300, determining a location of the device based on wireless signals received by module 308. Various characteristics of the wireless signals can be detected, such as the source, strength (e.g., RSSI values), timing, and/or correlation of the wireless signals received by module 308. The source of (e.g., transmitter of) the wireless signals is also referred to as a wireless beacon (or simply a beacon). Module 308 can detect wireless signals, and optionally the various characteristics of the wireless signals, at regular or irregular intervals. Module 308 can also detect wireless signals, and optionally the various characteristics of the wireless signals, in response to various events, such as a request from another module of system 300.

The wireless beacons can transmit various types of wireless signals in various manners. For example, the wireless beacons may be wireless access points transmitting Wi-Fi signals, cell transceivers (e.g., cell towers) transmitting cellular signals, television transmitters transmitting television signals at various frequencies, radio transmitters transmitting AM radio or FM radio at various frequencies, Bluetooth transmitters transmitting Bluetooth signals, Bluetooth Low Energy (BLE) transmitters transmitting low energy Bluetooth signals, Near Field Communication (NFC) transmitters transmitting NFC signals, and so forth. The wireless signals can also be non-electromagnetic signals, such as audio waves, ultrasound, light, and so forth.

Wireless signal detection module 308 can determine the location of the device based on received wireless signals in different manners. In one or more embodiments, a mapping of particular characteristic values (e.g., source and strength) for one or more wireless signals to locations is maintained. This mapping can be maintained locally at the device, or remotely (e.g., at another device accessed via a network or other communication link). The detected wireless signal characteristics at a particular time (e.g., the sources and strengths of each of one or more wireless signals detected at that particular time) are compared to the mapping, and a corresponding location readily identified. In other embodiments, the wireless signals themselves include the location. For example, a beacon may transmit the location of the beacon in the wireless signals.

Wireless signal detection module 308 provides or otherwise makes available the wireless signal determined location of the device to location determination module 302. Module 308 can also provide or otherwise make available to module 302 additional information, such as an indication of the strength of signals received by module 308 from the one or more beacons. An accuracy of the wireless signal determined location can also be determined, such as by wireless signal detection module 308 and/or location determination module 302. The accuracy can be determined in different manners, such as based on the strength (e.g., RSSI values) of signals received by module 308 from the one or more beacons, a number of beacons from which wireless signals are detected by module 308, and so forth.

Wireless signal detection module 308 can determine the location of the device at regular or irregular intervals.

Module 308 can also determine the location of the device in response to various events, such as a request from another module of the device and/or of system 300.

Inertial sensor module 310 implements inertial sensor functionality for system 300, determining a location of the device based on one or more inertial sensors that detect movement (e.g., rotation, motion, velocity, etc.), location, and/or direction. These inertial sensors can be, for example, MEMS (Microelectromechanical Systems or Microelectronicmechanical Systems) sensors. These inertial sensors can include, for example, an accelerometer, a compass, a gyroscope, a barometric altimeter, and so forth. Inertial sensor module 310 collects data regarding the detected movement, position, and/or direction of the device from these inertial sensors, and determines a location of the device based on a previous location of the device and the data from the inertial sensors. For example, if the inertial sensors indicate that the device has moved two feet to the East since the previous location of the device was determined, then inertial sensor module 310 determines that the location of the device is two feet to the East of the previously determined location.

It should also be noted that although inertial sensor module 310 is illustrated as being part of system 300, the inertial sensors can be included as part of the device for which the location is being determined or can be implemented as a separate component or device from the device for which the location is being determined. For example, inertial sensors can be implemented as part of a watch worn by a user, as part of a device attached to (or part of) a user's shoe or other clothing, as part of a heart rate monitor component, and so forth.

Inertial sensor module 310 provides or otherwise makes available the inertial sensor determined location of the device to location determination module 302. Module 310 can also provide or otherwise make available to module 302 additional information, such as an indication of an amount of time inertial sensors have been determining the location of the device. An accuracy of the inertial sensor determined location can also be determined, such as by inertial sensor module 310 and/or location determination module 302. The accuracy can be determined in different manners, such as based on the inertial sensors being used by module 310, the amount of time that the movement has been tracked by the inertial sensors, and so forth.

Inertial sensor module 310 can determine the location of the device at regular or irregular intervals. Inertial sensor module 310 can also determine the location of the device in response to various events, such as a request from another module of the device and/or of system 300.

3D mapping module 304 determines a location of the device based on a 3D map of the environment in which the device is located. This environment refers to the surroundings of the device, such as the room or indoor space in which the device is located, the outdoor space in which the device is located, and so forth. 3D mapping module 304 generates a 3D map of the current environment of the device. The 3D map is a 3D representation of the current environment of the device, identifying various elements (e.g., edges, surfaces, objects, etc.) as well as a distance to (or depth of) those elements from or relative to one another and/or the device. The 3D map can be used by 3D mapping module 304 to identify the location of the device in the current environment.

Module 304 tracks a user within the environment by comparing the positions of various detected tracking points (e.g., high contrast edges, objects, etc.) relative to the previous positions of those tracking points in the environment, and from this comparison determining a new location of the user. For example, the change in angle and/or distance to particular tracking points in the current environment before and after movement of the device can be used to readily determine the movement of the device. This tracking can be performed using any of a variety of public and/or proprietary tracking techniques.

3D mapping module 304 can determine the location of the device at regular or irregular intervals. Module 304 can also determine the location of the device in response to various events, such as a request from another module of the device and/or of system 300.

3D mapping module 304 can generate a 3D map (also referred to as a 3D depth map) of the current environment and track movement within the current environment based on any of a variety of different 2-dimensional (2D) and/or 3D sensors and techniques. For example, module 304 can use a 3D camera to generate the 3D map, such as by using structured light (e.g., analyzing how light progresses in a pattern through the environment) to generate the 3D map. By way of another example, module 304 can use a time of flight camera to generate the 3D map, emitting light at various frequencies and measuring the time taken for the light to reach the various tracking points in the environment and/or a phase shift in the light reaching the various tracking points. By way of another example, module 304 can use stereoscopic cameras, generating a 3D map from two or more cameras at known distances from one another. By way of yet another example, module 304 can use motion stereo techniques with a single 2D camera, analyzing multiple images over time to generate the 3D map. Various other types of sensors can also be used, such as infrared sensors, sonar, LIDAR (Light Detection And Ranging), and so forth.

It should be noted that the cameras or sensors used to generate the 3D map can be dedicated cameras or sensors, being used to generate the 3D map but not used for other purposes. Alternatively, the cameras or sensors used to generate the 3D map can be general purpose or multipurpose cameras or sensors used for other purposes. For example, these cameras or sensors can be used for video capture (e.g., a user capturing home movies, for video conferencing, and so forth), for image capture (e.g., a user taking pictures), and so forth.

Given the 3D map of the environment, the location of the device within that environment can be readily determined. Movement of the device within the environment can be tracked, allowing the location of the device to be readily determined based on the tracking and a previous location of the device. Based on the 3D map of the environment, the location of the device can be determined with greater accuracy than is typically available from inertial sensors, and without the drift or accumulated error typically found with inertial sensors. For example, over a period of 30 seconds the location of the device as determined based on the inertial sensors may be accurate to within 20 meters, but the location of the device as determined based on the 3D map may be accurate to within one foot.

3D mapping module 304 provides or otherwise makes available the 3D mapping determined location of the device to location determination module 302. Module 304 can also provide or otherwise make available to module 302 additional information, such as an indication of the number of tracking points being used by module 304 to determine the 3D mapping determined location. An accuracy of the 3D mapping determined location can also be determined, such as by 3D mapping module 304 and/or location determination module 302. The accuracy can be determined in different manners, such as based on a number of tracking points that are accurately detected by module 304, based on an amount of time that module 304 has been generating a 3D map for the environment, and so forth.

The previous location (e.g., used by module 304 in tracking movement, used by inertial sensor module 310 in determining a location of the device, etc.) is the location determined by location determination module 302. In one or more embodiments, the previous location is a location determined by one or more of modules 306-310. Thus, for example, the previous location can be based on the GNSS determined location as determined by module 306 and/or the wireless signal determined location as determined by module 308. In other embodiments, the previous location is a location determined based on the 3D mapping determined location as determined by 3D mapping module 304.

In one or more embodiments, known 3D maps of environments are accessible to 3D mapping module 304. These known 3D maps are maintained as map data in, for example, map data stores 106 and/or 108 of FIG. 1. These known 3D maps include portions (e.g., particular objects or elements, particular points, etc.) having known locations and also identify these known locations, allowing 3D mapping module 304 to know the location of the environment. Furthermore, given these known 3D maps the location of the device within the environment can be readily identified by comparing the locations of the tracking points in the known 3D maps to the 3D map generated by 3D mapping module 304. For example, the change in angle and/or distance from the device to particular tracking points in the generated 3D map and in the known 3D map can be readily used to determine the location of the device within the environment. This determination can be performed using any of a variety of public and/or proprietary mapping techniques. Thus, given the known location of the 3D map of an environment, as well as the known location of the device within the environment, the location of the device can be readily determined.

The known 3D maps can be obtained in various manners. In one or more embodiments, various companies or organizations generate the known 3D maps and identify the locations of portions included in those known 3D maps. For example, a store or mall operator may have known 3D maps for the store or mall generated, a museum operator may have known 3D maps for the museum generated, and so forth. These known 3D maps can be made available to system 300, providing the modules 304 with known 3D maps of the various environments.

The known 3D maps can additionally and/or alternatively be obtained in other manners. For example, crowd sourcing techniques can be used to obtain the known 3D maps. When 3D mapping module 304 generates a 3D map for an environment, the 3D map as well as the location of the environment (e.g., as determined by location determination module 302 based on modules 304, 306, 308, and/or 310) is provided to one or more map data stores and maintained as a known 3D map. The location of the environment is treated as the location of the various portions included in the known 3D map. As different modules 304 generate different 3D maps for different environments, those 3D maps and associated locations of the environments are also provided to the one or more map data stores and maintained as known 3D maps.

In one or more embodiments, changes to the environment can also be detected by 3D mapping module 304 by comparing the generated 3D map to the known 3D map. If the differences between the generated 3D map and the known 3D map exceed a threshold (e.g., if at least a threshold number of tracking points have moved, been added, and/or been removed; if a tracking point is moved at least a threshold amount; etc.), module 304 can determine that the environment has changed. The differences between the generated 3D map and the known 3D map can be identified and maintained in the one or more map stores as associated with the known 3D map, or the generated 3D map can replace the known 3D map. Thus, changes to the environment over time (e.g., rearrangement of furniture or other objects, removal and/or insertion of walls or other objects, etc.) can be identified and the known 3D map updated to reflect such changes.

Location determination module 302 receives the 3D mapping determined location from 3D mapping module 304, the GNSS determined location from GNSS module 306, the wireless signal determined location from wireless signal detection module 308, and the inertial sensor determined location from inertial sensor module 310. Location determination module 302 combines the various locations determined by modules 302-310 to generate location identification 312. Module 302 can combine the various locations determined by modules 302-310 in various manners, such as by using a Kalman filter, weighted combining or averaging of determined locations (e.g., multiplying each determined location (the coordinates of each determined location) by a coefficient or weighting and adding or averaging the weighted locations), other (typically weighted) techniques or algorithms, and so forth.

The location identification 312 generated by location determination module 302, as well as the 3D mapping determined location from 3D mapping module 304, the GNSS determined location from GNSS module 306, the wireless signal determined location from wireless signal detection module 308, and the inertial sensor determined location from inertial sensor module 310, can identify a location using various coordinate systems. In one or more embodiments, the coordinate system is an x, y, z coordinate system (e.g., latitude, longitude, and altitude) coordinate system, although other coordinate systems can alternatively be used.

In one or more embodiments, a coefficient or weighting is applied to each of the locations determined by modules 302-310 with each coefficient or weighting indicating how much the corresponding determined location influences location identification 312. The value of this coefficient or weighting is different for different modules, such as being highest for 3D mapping determined locations, next highest for GNSS determined locations, next highest for wireless signal determined locations, and lowest for inertial sensor determined locations. Locations with higher valued coefficients or weights have a greater effect on the location identification than lower valued coefficients or weights.

The coefficients or weights applied by module 302 for each module 304-310 can vary over time based on the accuracy of the determined location provided by that module. The accuracy of a particular determined location from a module 304-310 can vary, as discussed above. As the accuracy of the location determined by a module 304-310 increases, so does the coefficient or weight applied to the location determined by that module. Similarly, as the accuracy of the location determined by a module 304-310 decreases, so does the coefficient or weight applied to the location determined by that module.

Location determination module 302 can generate location identifications 312 at regular or irregular intervals. For example, modules 304-310 can determine locations at different rates and module 302 can generate location identifications 312 at the same rate as the fastest rate that a module 304-310 determines locations. By way of another example, module 302 can generate location identifications 312 at some other regular rate, or at irregular rates (e.g., whenever a new determined location is received from a module 304-310).

Because different modules 304-310 can determine locations at different rates, module 302 may not receive a determined location from one or more modules 304-310 when generating a location identification 312. In one or more embodiments, if a determined location is not received from a module 304-310, then no determined location for that module 304-310 is used in determining location identification 312 (e.g., the coefficient or weight of a determined location from that module is zero). The coefficient or weight for a determined location of that module is returned to its normal coefficient or weight when a determined location of that module is received.

For example, assume 3D mapping module 304 determines and provides to location determination module 302 a location of the device every 100 milliseconds (ms), and that inertial sensor module 310 determines and provides to location determination module 302 a location of the device every 1ms. When module 304 and module 310 both determine and provide a location of the device to module 302, the coefficient for the location from module 304 can be 0.95, and the coefficient for the location from module 310 can be 0.05. For the next 99 ms, however, module 304 does not provide a location of the device to module 302, so the coefficient for the location from module 304 (which is not provided) is 0.00 and the coefficient for the location from module 310 is 1.00. One millisecond later, both module 304 and module 310 determine and provide a location of the device to module 302, so the coefficient for the location from module 304 returns to 0.95, and the coefficient for the location from module 310 returns to 0.05. Thus, every 100 ms when the location of the device from module 304 is received, that location from module 304 is the predominant factor in determining location identification 312. However, for the intervening 99 ms, the location of the device from module 310 is the predominant factor.

The rates at which different modules 304-310 determine locations can also vary based on various criteria. One such criteria is the availability of locations determined by other modules with a particular accuracy. If another module 304-310 is determining locations of the device with at least a particular accuracy, then the rate at which other modules 304-310 determine locations can be reduced. For example, if GNSS module 306 generates GNSS determined locations with at least a threshold accuracy (e.g., within 10 meters), then the rate at which 3D mapping module 304 generates 3D mapping determined locations can be reduced to conserve power (by not expending the resource to generate 3D mapping determined locations as frequently). Thus, the rates at which (and/or whether) different modules 304-310 determine locations can be adjusted to obtain a desired accuracy. For example, if GNSS module 306 generates GNSS determined locations that do not have at least a desired accuracy (e.g., within 2 meters), then the rate at which 3D mapping module 304 generates 3D mapping determined locations can be increased so that the desired accuracy for locations identification 312 is obtained.

The accuracy of location identification 312 can be readily determined based on the accuracies of the locations determined by modules 304-310 as well as the coefficients or weights applied to the locations determined by modules 304-310. For example, the accuracy of location identification 312 can be determined using a weighted combining or averaging technique in which the accuracies of locations determined by modules 304-310 are weighted (e.g., using the same coefficients or weights as are applied to the locations determined by modules 304-310, as discussed above) and averaged, added, or otherwise combined.

Location identification 312 can be provided to various programs and/or recorded, as discussed above. Additional, location identification 312 can be provided to one or more of modules 304-310, allowing modules 304-310 to use the location of the device as determined by location determination module 302 in subsequently determining locations of the device. For example, 3D mapping module 304 can use the location identification 312 as a previous location. By way of another example, GNSS module 306 can use the location identification 312 to assist in determining which satellites GNSS module 306 is expected to receive signals from and thus allow module 306 to determine a location more quickly.

In addition to providing location identification 312 to various programs and/or recording location identification 312, the accuracy of location identification 312 can also be provided to various programs and/or recorded. Different programs can take different actions and/or provide different functionality based on the accuracy of location identification 312. For example, different map display modes can be used by a program based on the accuracy of location identification 312, different types of information can be displayed by a program based on the accuracy of location identification 312, whether an orientation or direction of view of the device (as discussed in more detail below) is used by the program in determining what information to display or otherwise present can be based on the accuracy of location identification 312 (e.g., orientation or direction of view of the device being used by the program only if the accuracy of location identification 312 reaches a particular threshold, such as 1 meter), and so forth.

In one or more embodiments, programs can also register (e.g., with location determination module 302, or another program or module) for a particular accuracy that the program desires. The program can then be executed (or awakened or otherwise activated) in response to location identification 312 having the desired accuracy, and can be shut down or de-activated (or shut down or de-activate itself) in response to location identification 312 not having the desired accuracy. Location determination module 302 can also optionally adjust the rates at which (and/or whether) different modules 304-310 determine locations in order to obtain the desired accuracy for location identification 312 (e.g., the highest particular accuracy for which a program has registered).

Known 3D maps can be obtained using crowd sourcing, as discussed above. In addition, various additional information can be obtained using crowd sourcing, and this additional information provided to one or more of modules 304-310. This additional information can be, for example, indications of location identifications provided by one or more other devices in the same environment. Other devices in the same environment can be detected in a variety of different manners, such as based on a strength of a signal transmitted by the device, based on whether a particular type of signal (e.g., Bluetooth or NFC) is detected from the device, and so forth. The location identifications provided by the one or more other devices in the same environment can be received by system 300 (e.g., from those other devices directly, from a remote service, etc.) and used to determine an approximate location of the device by system 300. This approximate location can be determined in different manners, such as using the location identification provided by another device, combining (e.g., averaging) location identifications provided by other devices, and so forth. This approximate location can be used in different manners by modules 304-310, such as using the approximate location as a starting point to begin tracking movement and/or determining the location of the device within the environment more quickly.

Additionally, in one or more embodiments location identification 312 includes an indication of an orientation or direction of view of the device. The orientation or direction of view of the device refers to the direction that the device (e.g., a camera or other image capture sensor) and/or user of the device is pointed. One or more modules 304-310 can provide the orientation or direction of view to location determination module 302. Certain inertial sensors (e.g., a compass) can determine an orientation or direction of view, and thus inertial sensor module 310 can provide an orientation or direction of view to module 302.

3D mapping module 304 can also readily determine an orientation or direction of view based on an orientation of a known 3D map. The orientation of the known 3D map can be determined in different manners, such as provided by the company or organization that provided the known 3D map, provided by the system 300 that provided the known 3D map (e.g., as determined by a compass of that system 300), and so forth. Given the orientation of the known 3D map and the angle from the device to one or more particular tracking points in the current environment, the orientation of the device can be readily determined using any of a variety of public and/or proprietary techniques.

The orientations or directions of view provided by different modules 304-310 can be combined by module 302 in various manners, analogous to the combining of locations determined by the modules 304-310 as discussed above. Weights or coefficients can be applied to the orientations or directions of view provided by different modules 304-310 based on the accuracies of the orientations or directions of view provided by the modules 304-310, based on the accuracies of the locations provided by modules 304-310 (e.g., the same coefficient or weights as applied to the locations determined by the modules 304-310), and so forth. For example, module 302 can combine the various orientations or directions of view by using a Kalman filter, weighted combining or averaging of orientations or directions of view (e.g., multiplying each orientation or direction of view by a coefficient or weighting and adding or averaging the weighted orientations or directions of view), other (typically weighted) techniques or algorithms, and so forth.

Thus, not only does location identification 312 provide the location of the device, but can also provide the orientation or direction of view of the device. Thus, for example, not only can location identification 312 provide an indication of the room, building, etc. in which the device is located, but also which direction the device and user are facing (e.g., which wall the device and user are facing, whether the device and user are facing a particular billboard at that location, and so forth).

In the discussions above, the device is discussed as including various sensors to determine a 3D map. Additionally or alternatively, the sensors can be located external to the device. For example, a particular room or other environment can include one or more cameras or other sensors. These other cameras or sensors can generate the 3D map of the environment, analogous to 3D mapping module 304 as discussed above. These other cameras or sensors can similarly track movement of an object (e.g., the user with the device) in the environment.

Such cameras or sensors can track a particular device and/or user in different manners. In one or more embodiments, the device and/or user identifies itself to the cameras or sensors (e.g., remains in a particular location, performs a particular action such as waving an arm or hand, and so forth). The device can also communicate with the camera or sensor by receiving an identifier of the camera or sensor. An identifier of the camera or sensor (e.g., a network address) can be received in various manners, such as by the camera or sensor transmitting wireless signals identifying the camera or sensor, a tag (e.g., barcode, high capacity color barcode, etc.) present in the environment that can be scanned by the device, and so forth. The device can access (e.g., via various networks) the cameras or sensors, and 3D mapping module 304 can receive from such cameras or sensors the 3D map of the environment as well as the location of the device within the environment.

An orientation or direction of view can also be detected by such cameras or sensors, and provided to 3D mapping module 304. The orientation or direction of view can be detected in various manners, such as by using any of a variety of public and/or proprietary face detection techniques to identify at least part of the face (e.g., the eyes) of a user of the device and the direction of view of the user's face, and this identified direction used as the orientation or direction of view. Alternatively other public and/or proprietary techniques can be used to identify the direction of a user's head, headgear (e.g., a hat), and so forth, and this identified direction used as the orientation or direction of view.

One or more of modules 302-310 can also use various additional techniques in determining a location of the device. In one or more embodiments, one or more of modules 302-310 take into account physical limitations of users, and exclude some determined locations if physical limitations of users are exceeded. For example, if a newly determined location by a module 304-310 indicates that a user has moved greater than a threshold distance (e.g., 10 meters) in a second, then the module does not provide the determined location to location determination module 302 or location determination module 302 ignores the newly determined location (e.g., the determined location is given a coefficient or weight of zero).

Figure 4:
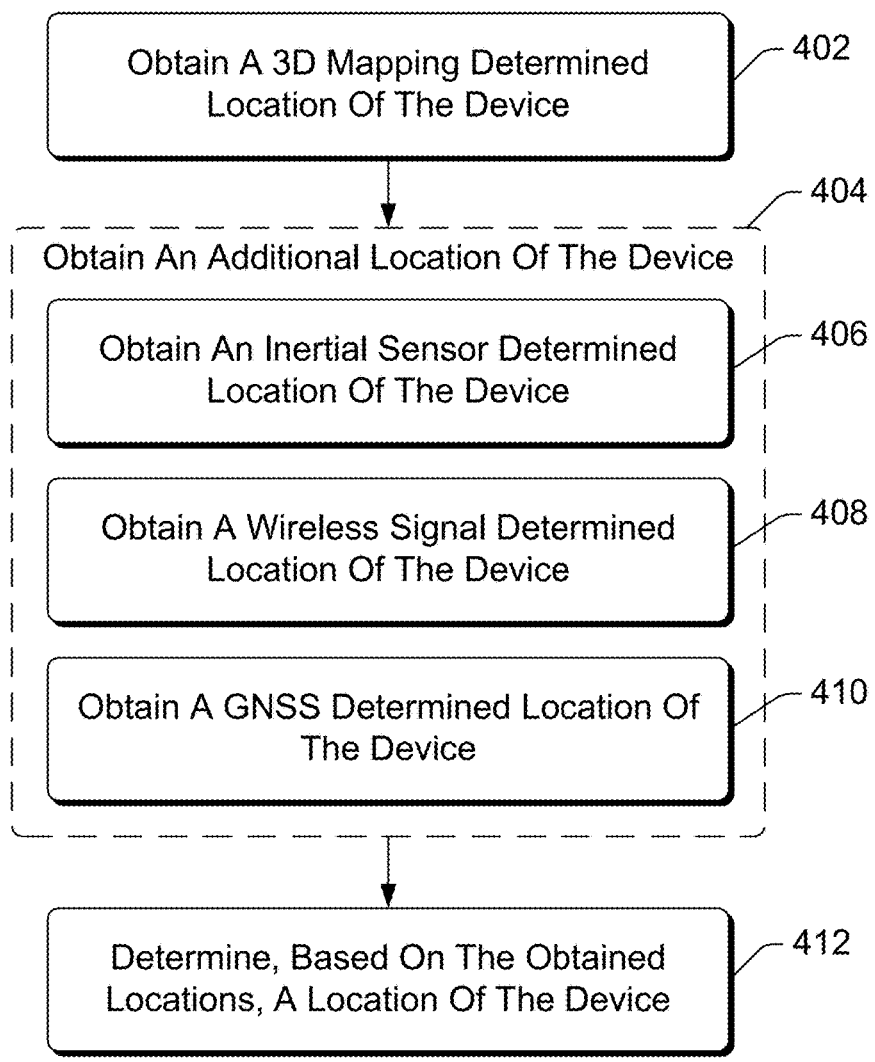
FIG. 4 is a flowchart illustrating an example process for a device implementing the hybrid device location determination system in accordance with one or more embodiments.

FIG. 4 is a flowchart illustrating an example process 400 for a device implementing the hybrid device location determination system in accordance with one or more embodiments. Process 400 is carried out by a hybrid location determination system, such as system 104 of FIG. 1 or system 300 of FIG. 3, and can be implemented in software, firmware, hardware, or combinations thereof. Process 400 is shown as a set of acts and is not limited to the order shown for performing the operations of the various acts. Process 400 is an example process for implementing the hybrid device location determination system; additional discussions of implementing the hybrid device location determination system are included herein with reference to different figures.

In process 400, a 3D mapping determined location of the device at a particular time is obtained (act 402). This 3D mapping determined location is obtained based on a 3D map of an environment in which the device is located, as discussed above.

An additional location of the device at the particular time is also obtained (act 404). Obtaining this additional location can include obtaining an inertial sensor determined location of the device (act 406), obtaining a wireless signal determined location of the device (act 408), and/or obtaining a GNSS determined location of the device (act 410). These determined locations in act 404 can be obtained in different manners, as discussed above.

Based on these locations obtained in acts 402 and 404, a location of the device at the particular time is determined (act 412). This determination can be based on various weights associated with the different obtained locations based on the accuracy of the various obtained locations, as discussed above. Process 400 can be repeated at regular or irregular intervals, determining the location of the device at additional times.

The hybrid device location determination system techniques discussed herein support various different usage scenarios. The 3D mapping determined locations are typically much more accurate than the other determined locations, oftentimes providing locations to within a foot of the actual physical location of the device or user rather than to within the nearest 10-50 meters as can be typical with GNSS determined locations, wireless signal determined locations, and/or inertial sensor determined locations. The 3D mapping determined locations also do not drift or accumulate error over time as is typical with other determined locations, such as inertial sensor determined locations. Thus, the techniques discussed herein allow for accurate location determinations.

The 3D mapping determined locations can also be determined faster than some other determined locations, allowing the location of the device to be provided to other programs more quickly. For example, the 3D mapping determined locations may be determined in less than one second, rather than the 30 or more seconds that can be typical for GNSS determined locations. Thus, the techniques discussed herein allow for location determinations more quickly.

The techniques discussed herein also allow for location determinations for a device that are based on the actual environment in which the device is situated. Rather than just detecting signals from various satellites and/or other transmitters, the actual environment is mapped and used in determining the 3D mapping determined locations.

The techniques discussed herein also provide accurate location determination in a power efficient manner. Rather than relying solely on 3D mapping determined locations, which can consume large computational resources and thus larger amounts of power, the 3D mapping determined locations are used in combination with determined locations from lower-powered components. For example, 3D mapping determined can be used at one interval (e.g., every 100 ms or every 1 second) to determine the location of the device, and inertial sensors (which consume less power than 3D mapping computations) can be used at a shorter interval (e.g., every 1ms or every 10 ms) to provide lower-powered modifications to the location of the device between the 3D mapping determined locations.

Various actions such as communicating, receiving, sending, recording, storing, generating, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
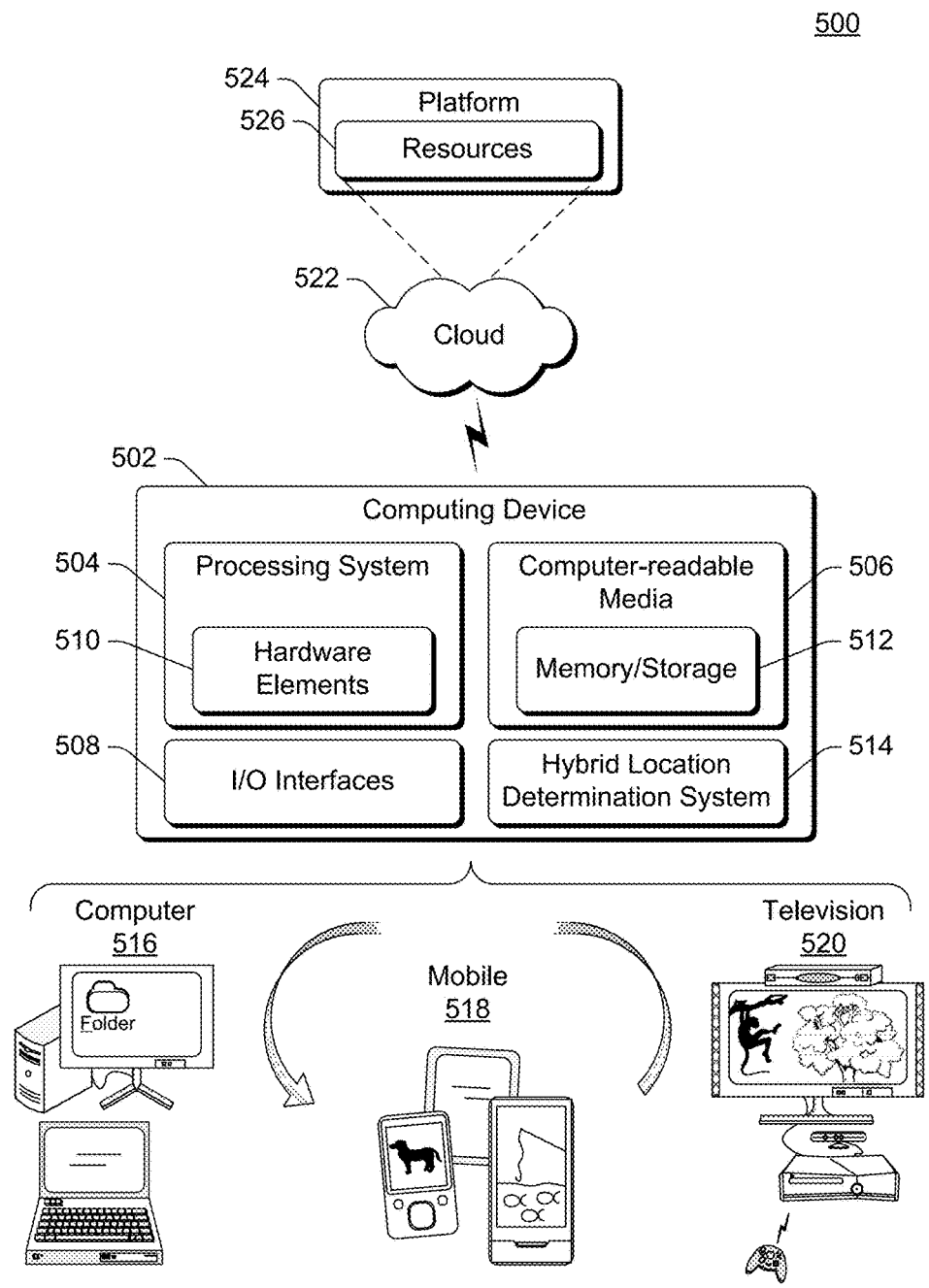
FIG. 5 illustrates an example system that includes an example computing device that is representative of one or more computing systems and/or devices that may implement the various techniques described herein.

FIG. 5 illustrates an example system generally at 500 that includes an example computing device 502 that is representative of one or more computing systems and/or devices that may implement the various techniques described herein. The computing device 502 may be, for example, a client device, an on-chip system, and/or any other suitable computing device or computing system.

The example computing device 502 as illustrated includes a processing system 504, one or more computer readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer readable media 506 is illustrated as including memory/storage 512. The memory/storage 512 represents memory/storage capacity associated with one or more computer readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Computing device 502 also includes a hybrid location determination system 514. Hybrid location determination system 514 uses a combination of various different techniques to determine the location of computing device 502 at any particular time as discussed above. Hybrid location determination system 514 can, for example, be a hybrid location determination system 104 of FIG. 1, or a hybrid location determination system 300 of FIG. 3.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer readable media. The computer readable media may include a variety of media that may be accessed by the computing device 502. By way of example, and not limitation, computer readable media may include "computer readable storage media" and "computer readable signal media."

"Computer readable storage media" may refer to media and/or devices that enable persistent and/or non-transitory storage of information in contrast to mere signal transmission, carrier waves, or signals per se. Thus, computer readable storage media refers to non-signal bearing media. The computer readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer readable storage media described previously.

Combinations of the foregoing may also be employed to implement various techniques and modules described herein. Accordingly, software, hardware, and/or program modules may be implemented as one or more instructions and/or logic embodied on some form of computer readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of conserving power when determining a location of a device, the method comprising:
    generating, at the device using one or more sensors and techniques, a 3D depth map of an environment in which the device is located;
    obtaining a first location of the device at a first particular time interval based on the 3D depth map, the first location of the device obtained based on tracking movement of the device within the environment via the one or more sensors and techniques and using a previously determined location within the environment;
    obtaining a second location of the device at a second particular time interval based on a wireless signal determined location of the device, an inertial sensor determined location of the device, or a GNSS determined location of the device, the second particular time interval being different than the first particular time interval;
    increasing, to conserve power of the device, the first particular time interval at which the first location is obtained in response to the second location being determined with at least a threshold accuracy; and
    determining, by the device and based on both the first location and the second location, the location of the device.

2. A method as recited in claim 1, further comprising determining an orientation of the device at the particular time.

3. A method as recited in claim 1, the obtaining the first location of the device comprising:
    obtaining a known 3D depth map of the environment; and
    determining the first location based on both the generated 3D depth map and the known 3D depth map.

4. A method as recited in claim 3, the obtaining the known 3D depth map comprising obtaining the known 3D depth map from a remote map data store, the known 3D depth map having been generated by an additional device and provided to the remote map data store by the additional device, the additional device having generated the known 3D depth map in determining a location of the additional device.

5. A method as recited in claim 3, the known 3D depth map having been generated by an operator of the environment.

6. A method as recited in claim 3, further comprising replacing the known 3D depth map with the generated 3D depth map in response to detecting a change in the environment.

7. A method as recited in claim 1, the determining comprising:
    applying a first weighting to the first location to obtain a weighted first location;
    applying a second weighting to the second location to obtain a weighted second location; and
    combining the weighted first location and the weighted second location.

8. A method as recited in claim 7, the first weighting being dependent on an accuracy of the first location, and the second weighting being dependent on an accuracy of the second location.

9. A method as recited in claim 1, the first location being based at least in part on tracking the device in the environment using the 3D depth map.

10. A method as recited in claim 1, further comprising providing the location of the device and the 3D depth map of the environment to a remote map data store.

11. A method as recited in claim 1, the 3D depth map being generated by a 3D depth mapping module using one or more 2D or 3D sensors.

12. A system comprising:
    a receiver; and
    a processor in communication with the receiver, the processor configured to perform acts as follows:
    obtaining a 3D depth mapping determined location of a computing device at a first particular time interval based on a 3D depth map of an environment in which the computing device is located, the 3D depth map of the environment generated at the computing device via one or more sensors and techniques, the 3D depth mapping determined location of the computing device obtained based on tracking movement of the computing device within the environment via the one or more sensors and techniques and using a previously determined location within the environment;
    obtaining a wireless signal determined location of the computing device, an inertial sensor determined location of the computing device, or a GNSS determined location of the computing device at a second particular time interval, the second particular time interval being different than the first particular time interval;
    conserving power in the system by increasing the first particular time interval at which the 3D depth mapping determined location is obtained in response to the wireless signal determination location, the inertial sensor determined location, or the GNSS determined location being determined with at least a threshold accuracy; and determining, based on the obtained locations, a location of the computing device.

13. A system as recited in claim 12, the acts further comprising determining a direction of view of the computing device at the first particular time interval.

14. A system as recited in claim 12, the obtaining the 3D depth mapping determined location comprising:
obtaining a known 3D depth map of the environment; and
determining the 3D depth mapping determined location based on both the generated 3D depth map and the known 3D depth map.

15. A system recited in claim 14, the acts further comprising replacing the known 3D depth map with the generated 3D depth map in response to detecting a change in the environment.

16. A system as recited in claim 12, the determining the location comprising:
applying a first weighting to the 3D depth mapping determined location to obtain a weighted first location;
applying a second weighting to the wireless signal determined location, the inertial sensor determined location, or the GNSS determined location to obtain a weighted second location; and
combining the weighted first location and the weighted second location.

17. A system as recited in claim 16, the first weighting being dependent on an accuracy of the 3D depth mapping determined location, and the second weighting being dependent on an accuracy of the wireless signal determined location, the inertial sensor determined location, or the GNSS determined location to obtain a second weighted location.

18. A computing device comprising:
one or more processors; and
one or more memories having stored thereon multiple instructions that, when executed by the one or more processors, cause the one or more processors to:

generate, at the computing device using one or more sensors and techniques, a 3D depth map of an environment in which the computing device is located;

obtain a first location of the computing device at a first particular time interval based on the 3D depth map, the first location of the computing device obtained based on tracking movement of the computing device within the environment via the one or more sensors and techniques and using a previously determined location within the environment;

obtain a second location of the computing device at a second particular time interval based on a wireless signal determined location of the device, an inertial sensor determined location of the device, or a GNSS determined location of the device, the second particular time interval being different than the first particular time interval;

increase, to conserve power of the computing device, the first particular time interval at which the first location is obtained in response to the second location being determined with at least a threshold accuracy; and determine, based on both the first location and the second location, the location of the computing device.

19. A computing device as recited in claim 18, the instructions causing the one or more processors to determine the location of the computing device comprising instructions causing the one or more processors to:

apply a first weighting to the first location to obtain a weighted first location;

apply a second weighting to the second location to obtain a weighted second location; and combine the weighted first location and the weighted second location.

20. A computing device as recited in claim 19, the first weighting being dependent on an accuracy of the first location, and the second weighting being dependent on an accuracy of the second location.

* * * * *